United States Patent
Gao et al.

(10) Patent No.: US 8,594,047 B2
(45) Date of Patent: Nov. 26, 2013

(54) INTER-NODE B HANDOVER METHOD

(75) Inventors: Yin Gao, Shenzhen (CN); Bin Yu, Shenzhen (CN); Peng Hao, Shenzhen (CN); Peng Zhu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 131 days.

(21) Appl. No.: 13/258,130

(22) PCT Filed: Dec. 23, 2009

(86) PCT No.: PCT/CN2009/075907
§ 371 (c)(1),
(2), (4) Date: Sep. 29, 2011

(87) PCT Pub. No.: WO2010/118618
PCT Pub. Date: Oct. 21, 2010

(65) Prior Publication Data
US 2012/0026980 A1    Feb. 2, 2012

(30) Foreign Application Priority Data

Apr. 13, 2009    (CN) .......................... 2009 1 0132082

(51) Int. Cl.
*H04W 4/00*    (2009.01)
(52) U.S. Cl.
USPC ........... 370/331; 370/332; 370/333; 370/334; 455/436; 455/439; 455/442
(58) Field of Classification Search
USPC ..................... 370/331–334; 455/436–452.2
See application file for complete search history.

(56) References Cited

U.S. PATENT DOCUMENTS

| | | |
|---|---|---|
| 2007/0293224 A1 | 12/2007 | Wang et al. |
| 2009/0239570 A1* | 9/2009 | Koyanagi et al. .............. 455/525 |

FOREIGN PATENT DOCUMENTS

| CN | 101155416 A | 4/2008 |
|---|---|---|
| CN | 101404539 A | 4/2009 |
| EP | 2068582 A1 | 6/2009 |
| JP | 2007513569 A | 5/2007 |
| JP | 2007194749 A | 8/2007 |
| JP | 2008017195 A | 1/2008 |

(Continued)

OTHER PUBLICATIONS

3GPP TSG RAN WG1 Meeting #55, Nov. 10-14, 2008.*

(Continued)

*Primary Examiner* — Mark Rinehart
*Assistant Examiner* — Mang Yeung
(74) *Attorney, Agent, or Firm* — Oppedahl Patent Law Firm LLC

(57) ABSTRACT

The present invention discloses an inter-Node B handover method, wherein a target eNB sends a Handover Request Acknowledge message including handover reference frequency point information through a source eNB to a user equipment, wherein the handover reference frequency point information includes center frequency point information of an uplink component carrier designated for the user equipment to initiate a random access request. Further, the present invention discloses another inter-Node B handover method, wherein a target eNB orderly arrays center frequency point information of uplink component carriers of a target cell to obtain a first list, the target eNB sends a Handover Request Acknowledge message including the first list through a source eNB to a user equipment, and the user equipment requests a random access according to the center frequency point information of a first uplink component carrier. Through the solution of the present invention, the usage rate of the random access resources for the target eNB can be improved effectively and the conflict of random is accesses can be reduced.

15 Claims, 4 Drawing Sheets

(56) References Cited

FOREIGN PATENT DOCUMENTS

| | | | |
|---|---|---|---|
| JP | 2008502272 A | 1/2008 |
| JP | 2009510887 A | 3/2009 |
| JP | 2009544240 A | 12/2009 |
| JP | 2010537472 A | 12/2010 |
| WO | 2008008920 A2 | 1/2008 |
| WO | 2008053653 A1 | 5/2008 |
| WO | 2008096408 A1 | 8/2008 |
| WO | 2009022750 A2 | 2/2009 |

OTHER PUBLICATIONS

Initial Access Procedure for Asymmetric Wider Bandwidth in LTE—Advanced Nov. 10-14, 2008.

International Search Report in international application No. PCT/CN2009/075907, mailed on Apr. 1, 2010.

English Translation of the Written Opinion of the International Search Authority in international application No. PCT/CN2009/075907, mailed on Apr. 1, 2010.

Technical Specification Group Radio Access Network Jun. 30, 2007.

* cited by examiner

US 8,594,047 B2

INTER-NODE B HANDOVER METHOD

TECHNICAL FIELD

The present invention relates to the communication field, in particular to an inter-Node B handover method.

BACKGROUND

In relevant technologies, a Long Term Evolution (LTE) network consists of evolved Node Bs (eNBs) in an Evolved Universal Terrestrial Radio Access Network (E-UTRAN) and an Evolved Packet Core (EPC). The LTE is characterized by that the network tends to be flat. Further, the E-UTRAN comprises a set of eNBs connected with the EPC through an interface S1, and the eNBs can be connected with each other through an interface X2. It is should be noted that S1 and X2 are logic interfaces, one EPC can manage one or more eNBs, one eNB can also be controlled by multiple EPCs, and one eNB can manage one or more cells.

An LTE-Advanced (LTE-A) system is the next generation evolution system of the is LTE system. The LTE-A system employs a carrier aggregation technology to expand the transmission bandwidth, and each aggregated carrier is called a component carrier; as shown in FIG. 1, it can be seen that the component carriers include component carrier #1, component carrier #2 and component carrier #3, wherein the one filled with oblique lines is component carrier #1, the one filled with grids is component carrier #2, the one filled with vertical lines is component carrier #3, each component carrier includes multiple sub-carriers, and a component carrier can be continuous or discontinuous on the spectrum, that is, the spacing between component carriers can be 0. A downlink transmission bandwidth of the LTE-A system is formed by aggregation of multiple downlink component carriers; an uplink transmission bandwidth may include only one uplink component carrier, also may be formed by aggregation of multiple uplink component carriers, that is, the uplink bandwidth and downlink bandwidth of the system may include different amounts of component carriers. Even if the amounts of the uplink component carriers and downlink component carriers of the system are the same, the amount of component carriers included in the downlink receiving bandwidth of a terminal may still be different from the amount of component carriers included in the uplink sending bandwidth of the terminal.

As shown in FIG. 2, the downlink transmission bandwidth includes five downlink component carriers, namely, component carrier #1 to component carrier #5; the uplink transmission bandwidth includes only two uplink component carriers, namely, component carrier 1 and component carrier 2; in FIG. 2, oblique lines represent synchronization channels, vertical lines represent broadcast channels of the downlink component carriers #1, #2 and #3, and grids represent broadcast channels of the downlink component carriers #4 and #5; furthermore, system information in the broadcast channels of the downlink component carriers #1, #2 and #3 includes a frequency point position and a bandwidth of uplink component carrier 1, and system information in the broadcast channels of downlink component carriers #4 and #5 includes a frequency point position and a bandwidth of uplink component carrier 2. In is relevant technologies, the phenomenon of unequal amount of uplink component carriers and downlink component carriers can be called as asymmetric carrier aggregation.

In the LTE system, when a User Equipment (UE) performs inter-cell handover, a source service cell notifies broadcast-relevant part information acquired from a target cell, dedicated resource information distributed for the user equipment by the target cell, information of uplink/downlink frequency point and bandwidth and the like of the target cell to the user equipment through a Handover Command.

For inter-Node B cell handover, a Transparent Container of a Handover Request sent to the target eNB from a source eNB includes configuration information of Access Server (AS), key, Radio Resource Management (RRM) and the like, while a Transparent Container of a Handover Request Acknowledge message includes the broadcast-relevant part information of the target cell, the dedicated resource information distributed for the user equipment by the target cell, the information of uplink/downlink frequency point and bandwidth and the like of the target cell; since LTE system is a single-carrier system, the Transparent Container includes only one pair of uplink and downlink single frequency point information of the target cell, and if this information is default, it is deemed that all frequency point information of the target cell are the same as that of the current cell. For the handover in the LTE system, typically a non-contention based random access procedure is employed, comprising the following processing:

Step 1: notifying the dedicated random access resources for handover to the user equipment through the Handover Command, wherein the dedicated random access resources include a designated Random Access Channel (RACH) and a designated random access preamble, and sending the designated random access preamble, namely, a random access request, by the user equipment on the random access channel designated by the target cell;

Step 2: sending a random access response on the downlink by the target cell after the target cell receives the random access preamble sent from the user equipment; and Step 3: receiving the random access response sent from the target cell in a designated search window, finishing the random access process, and further finishing is the handover by the user equipment after the user equipment sends the preamble.

However, in a multi-carrier LTE-A system, both the uplink bandwidth and downlink bandwidth can include frequency point information of multiple component carriers, and the frequency point information of all component carriers of the target cell will be transmitted to the user equipment through the Handover Command; however, when the target cell includes multiple uplink frequency points and there are random access resources on all multiple frequency points, the user equipment is unable to determine which frequency point should be used for initiating the random access request, and if there is no special agreement between the user equipment and the eNB, problems such as waste of random access resources or conflict of random accesses may be caused.

SUMMARY

With respect to the problem that the user equipment is unable to determine a component carrier to request a random access for the handover in a multi-carrier LTE-A system in the relevant technologies, the present invention is proposed; therefore, the present invention is mainly aimed to provide an inter-Node B handover method to solve the above problem in the relevant technologies.

In order to achieve the above purpose, according to one aspect of the present invention, an inter-Node B handover method is provided to hand over a user equipment to a target cell of a target eNB from a source cell of a source eNB.

The present invention provides an inter-Node B handover method, the method comprises:

sending a Handover Request Acknowledge message including handover reference frequency point information by a target eNB through a source eNB to a user equipment, wherein the handover reference frequency point information comprises center frequency point information of an uplink component carrier designated for the user equipment to initiate a random access request; and requesting a random access by the user equipment according to the center frequency point information of the uplink component carrier.

In the above solution, the handover reference frequency point information may further comprise: center frequency point information of a downlink component carrier is for the target cell of the target eNB to send a random access response.

In the above solution, the method further comprises:

receiving the random access response sent from the target eNB by the user equipment according to the center frequency point information of the downlink component carrier after requesting the random access by the user equipment.

In the above solution, the Handover Request Acknowledge message may further include frequency point and bandwidth information of all component carriers of the target cell of the target eNB.

In the above solution, the handover reference frequency point information may be included in mobility control information of a transparent container of the Handover Request Acknowledge message.

In the above solution, the method further comprises:

sending the Handover Request Acknowledge message by the source eNB through an interface S1/X2 before receiving the Handover Request Acknowledge message by the user equipment, wherein if sending the Handover Request Acknowledge message by the source eNB through the interface X2, the Handover Request Acknowledge message is included in information of all service cells in a scheduled message to be sent; and the scheduled message comprises one of the following items: an interface X2 establishment message, an interface X2 establishment response message and an eNB configuration update message.

In the above solution, the processing of sending the Handover Request Acknowledge message by the source eNB through the interface S1 may comprise:

sending the transparent container of the Handover Request Acknowledge message by the source eNB through the interface S1 to a mobility management entity; and transparently transmitting the transparent container by the mobility management entity to the source eNB through a Handover Command message.

The present invention provides an inter-Node B handover method, involving a source eNB and a target eNB, the method comprises:

orderly arraying center frequency point information of uplink component carriers of a target cell by the target eNB to obtain a first list: the center frequency point information of a first uplink component carrier in the first list is the center frequency point information of the uplink component carrier for a user equipment to initiate a random access request;

sending a Handover Request Acknowledge message including the first list by the target eNB through the source eNB to the user equipment; and requesting a random access by the user equipment according to the center frequency point information of the first uplink component carrier.

In the above solution, the method further comprises:

orderly arraying center frequency point information of downlink component carriers of the target cell by the source eNB to obtain a second list: the center frequency point information of a first downlink component carrier in the second list is the center frequency point information of the downlink component carrier for the target cell to send a random access response.

In the above solution, the method further comprises:

receiving the random access response sent from the target eNB by the user equipment according to the center frequency point information of the first downlink component carrier after requesting the random access by the user equipment.

By means of the technical solution of the present invention, the problem that the user equipment is unable to determine the component carrier to request the random access for the handover in the multi-carrier LTE-A system in the relevant technologies is solved by adding the handover reference frequency point information in the Handover Request Acknowledge message, so that the usage rate of random access resources for the target eNB can be improved effectively and the conflict of random accesses can be reduced.

Other features and advantages of the present invention will be described in the description below, and partially are obvious from the description, or are known by implementing the present invention. The purpose and other advantages of the present invention can be achieved and obtained through the structure specially pointed out in the description, claims and drawings.

DETAILED DESCRIPTION

In the handover in a multi-carrier system, there is a problem that a user equipment is unable to determine a component carrier to send a random access request; therefore, the present invention provides an inter-Node B handover method; in an LTE-A system, when a user equipment needs to perform inter-Node B handover, a target eNB needs to send handover reference frequency point information of a target cell besides frequency point and bandwidth information of all component carriers of the target cell to a source eNB, wherein the handover reference frequency point information includes center frequency point information of an uplink component carrier designated by the target cell for the current user equipment performing the handover to initiate a random access request; when the source eNB receives the information, it can send the information to the current user equipment needing handover through an air interface message, and the user equipment can request the random access according to the uplink component carrier information designated in the handover reference frequency point information.

The preferred embodiments of the present invention will be described below in combination with the drawings. It should be understood that the preferred embodiments described below are only used for describing and explaining the present is invention and not used for limiting the present invention.

In the following description, for the purpose of explanation, many specific details are described for thorough understanding of the present invention. However, obviously, the present invention can also be implemented without these specific details; furthermore, the following embodiments and all details in the embodiments can be combined optionally within the spirit and scope of the appended claims.

Method Embodiment 1

Figure 1:
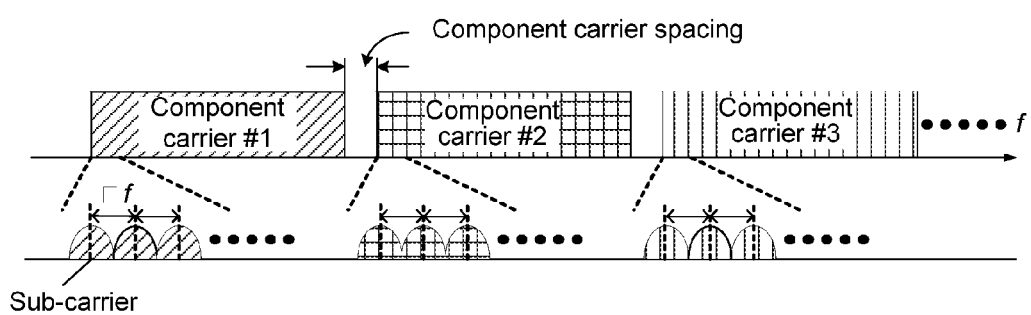
FIG. 1 shows a carrier aggregation diagram of an LTE-A system in the relevant technologies.
Figure 2:
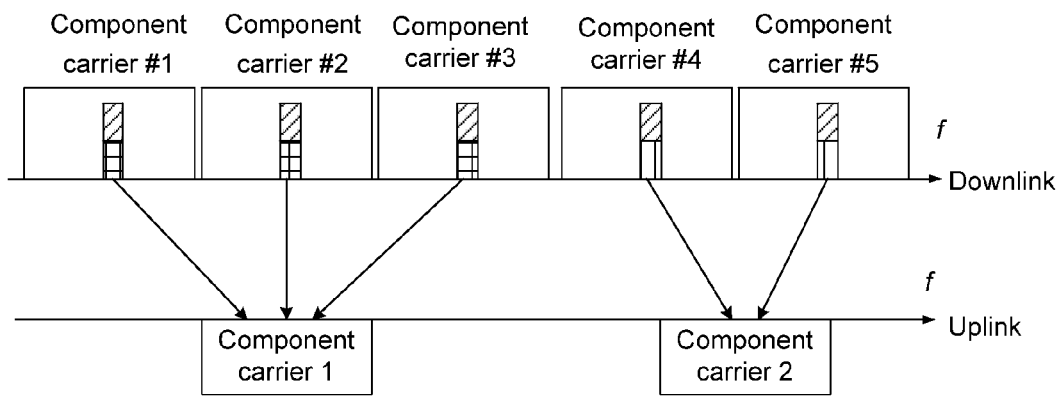
FIG. 2 shows a diagram of multiple downlink component carriers corresponding to one downlink component carrier in the LTE-A system in the relevant technologies.
Figure 3:
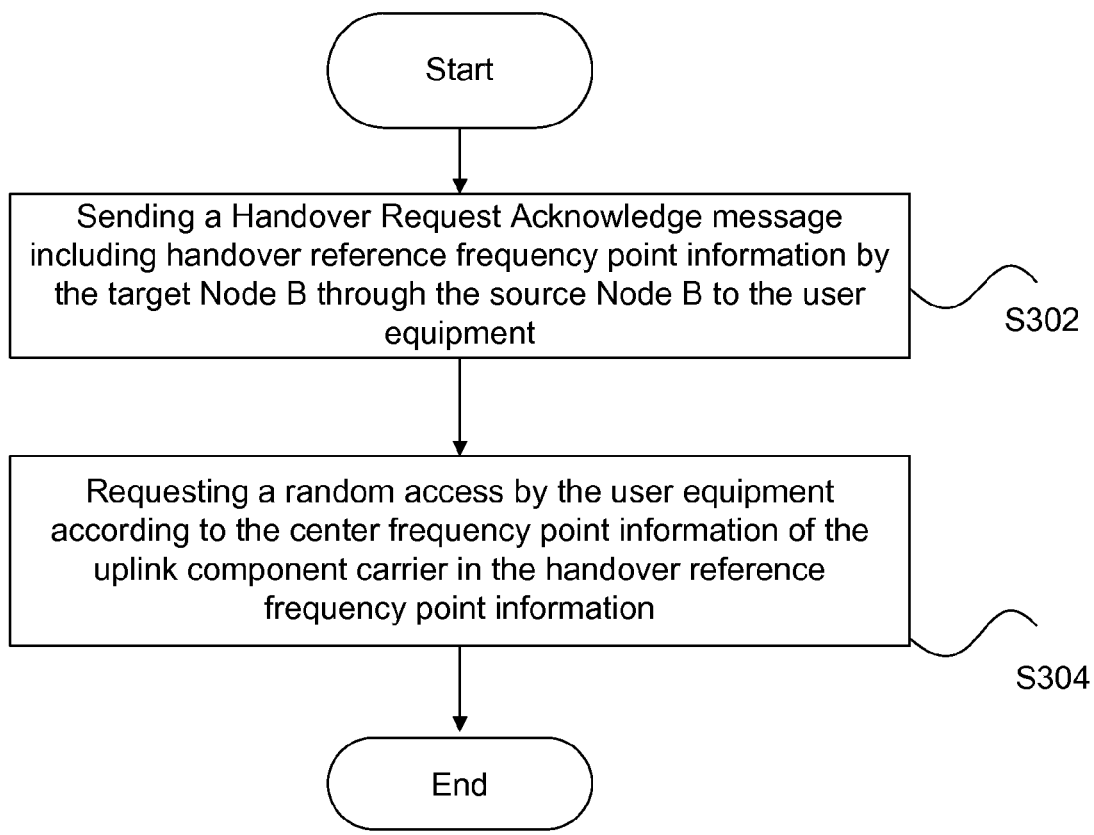
FIG. 3 shows a flowchart of an inter-Node B handover method according to embodiment 1 of the present invention.

According to the embodiments of the present invention, an inter-Node B handover method is provided to hand over a user equipment to a target cell of a target eNB from a source cell of a source eNB. FIG. 3 shows a flowchart of the inter-Node B handover method according to embodiment 1 of the present invention, as shown in FIG. 3, the following processing (steps S302-S304) is included:

Step S302: the target eNB sends a Handover Request Acknowledge message including handover reference frequency point information through the source eNB to the user equipment;

specifically, the target eNB sends the Handover Request Acknowledge message including the handover reference frequency point information and frequency point and bandwidth information of all component carriers of the target cell through the source eNB to the user equipment, wherein the handover reference frequency point information includes center frequency point information of an uplink component carrier designated for the user equipment to initiate a random access request, and the designation can be selecting randomly or selecting an uplink component carrier with relatively low load; in practical application, the target eNB can send the Handover Request Acknowledge message through an interface S1/X2, so as to transmit the reference frequency point information designated by the target cell of the target eNB to send a random access request during the handover of the user equipment to the source cell of the source eNB.

Preferably, the handover reference frequency point information can further include the center frequency point information of a designated downlink component carrier for the target cell (target eNB) to send a random access response, wherein the designation can be selecting randomly by the target cell or selecting a downlink component carrier is with relatively low load. The target eNB will send a random access response corresponding to the random access request to be initiated by the user equipment on the downlink component carrier, such that the user equipment can receive the random access response on the designated downlink component carrier. The above mode can establish a corresponding relationship between the uplink component carrier for the random access request and the downlink component carrier for the random access response, and avoid waste of resources caused by that the target eNB sends the random access response on all downlink component carriers as being unable to determine which downlink component carrier will be monitored by the user equipment.

It should be explained that the handover reference frequency point information could be included in the mobility control information of the Target eNB to Source eNB Transparent Container of the Handover Request Acknowledge message in the embodiments of the present invention. Table 1 shows the structure of the mobility control information including the handover reference frequency point information, as shown in Table 1, the mobility control information includes: a global ID of the target cell, frequency point information of the target cell, bandwidth information of the target cell, handover reference frequency point information of the target cell and other relevant information of mobility control.

TABLE 1

| Included information | Instructions |
| --- | --- |
| Global ID of the target cell | |
| Frequency point information of the target cell | Include all uplink and downlink frequency points of the target cell |
| Bandwidth information of the target cell | Bandwidth information of all corresponding frequency points |
| Handover reference frequency point information of the target cell | The handover reference frequency point information includes the center frequency point information of the uplink component carrier designated by the target cell for the current user equipment performing the handover to initiate the random access request; further, the handover reference frequency point information can also include the center frequency point information of the downlink component carrier designated by the target cell to send the random access response |
| Other relevant information of mobility control | Information such as t-304 timer, public radio resource configuration information and random access configuration and the like |

Step S304: the user equipment request the random access according to the center frequency point information of the uplink component carrier;

specifically, the user equipment sends the random access request on the component carrier indicated by the center frequency point information of the uplink component carrier; and preferably, after requesting the random access, the user equipment receives the random access response sent from the target eNB according to the center frequency point information of the downlink component carrier, i.e., receives the random access response on the component carrier indicated by the center frequency point information of the downlink component carrier.

Furthermore, in the LTE-A system, all uplink and downlink frequency point and bandwidth information of the service cells can be included in information of all service cells within the scope of the eNB in the messages of an interface X2 public flow, for example, an interface X2 establishment message, an interface X2 establishment response message and an eNB configuration update message.

The above technical solution will be described in detail below in combination with the drawings.

Example 1

The Target eNB Sends the Handover Request Acknowledge Message Through the Interface X2

Figure 4:
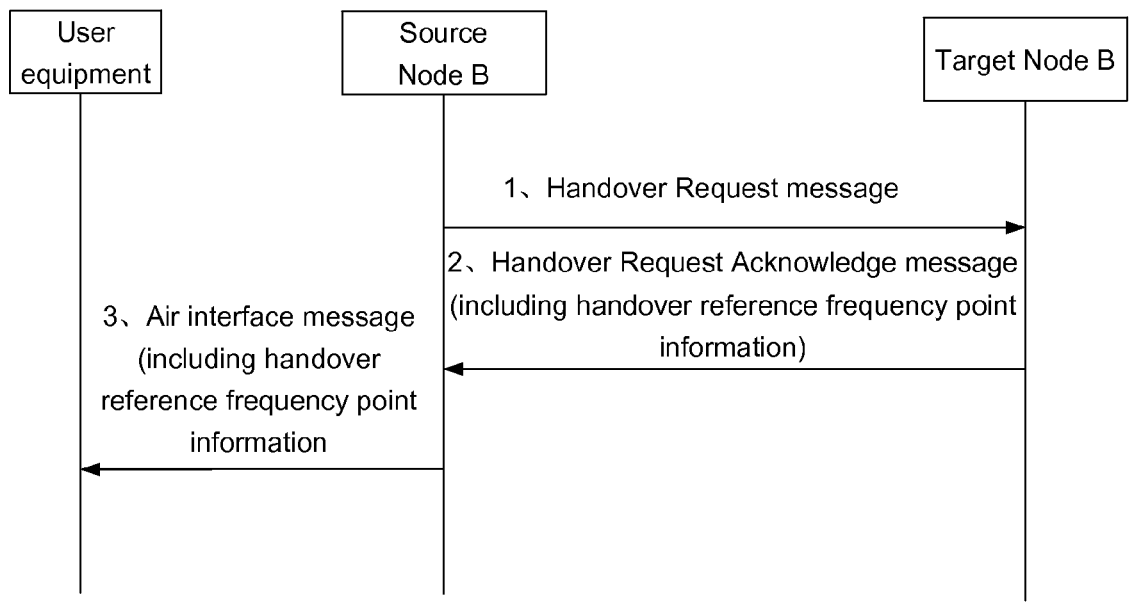
FIG. 4 shows a signaling flowchart of example 1 according to embodiments of the present invention.

FIG. 4 shows a signaling flowchart of example 1 according to the embodiments of the present invention, as shown in FIG. 4, the following processing is included:

Step 1: the source eNB sends a Handover Request message through an interface is X2 to the target eNB;

Step 2: after receiving the Handover Request message, the target eNB constructs a Handover Request Acknowledge message and sends it to the source eNB; specifically, when the target eNB constructs the Handover Request Acknowledge message, the handover reference frequency point information designated by the target cell is included in the Target eNB to Source eNB Transparent Container in the message; preferably, the handover reference frequency point information can be added in the mobility control information of the Transparent Container, specific structure of the mobility control information can refer to Table 1.

Specifically, the handover reference frequency point information can include the center frequency point information of the uplink component carrier designated by the target cell for the current user equipment performing the handover to initiate a random access request; preferably, it can further include the center frequency point information of the downlink component carrier designated by the target cell to send the random access response. Furthermore, the target eNB can also transmit the frequency point and bandwidth information of all component carriers of the target cell to the source eNB, in practical application, if the frequency point and bandwidth information of all component carriers is default, it is deemed that the frequency point and bandwidth information of all component carriers of the target cell is the same as that of the current cell.

Step 3: the source eNB receives the Handover Request Acknowledge message sent from the target eNB and sends this message to the user equipment through an air interface message, and after receiving the handover reference frequency point information in the message and the random access configuration information related to the component carrier, the user equipment performs the random access process on the designated time/frequency domain resources and reads the random access response message on the designated downlink component carrier.

Through the above processing, the eNB sends the Handover Request Acknowledge message including the handover reference frequency point information through the interface X2, such that the user equipment can send the random access request on the designated uplink component carrier and receive the random access response on the is designated downlink component carrier.

Example 2

The Target eNB Sends the Handover Request Acknowledge Message Through an Interface S1

Figure 5:
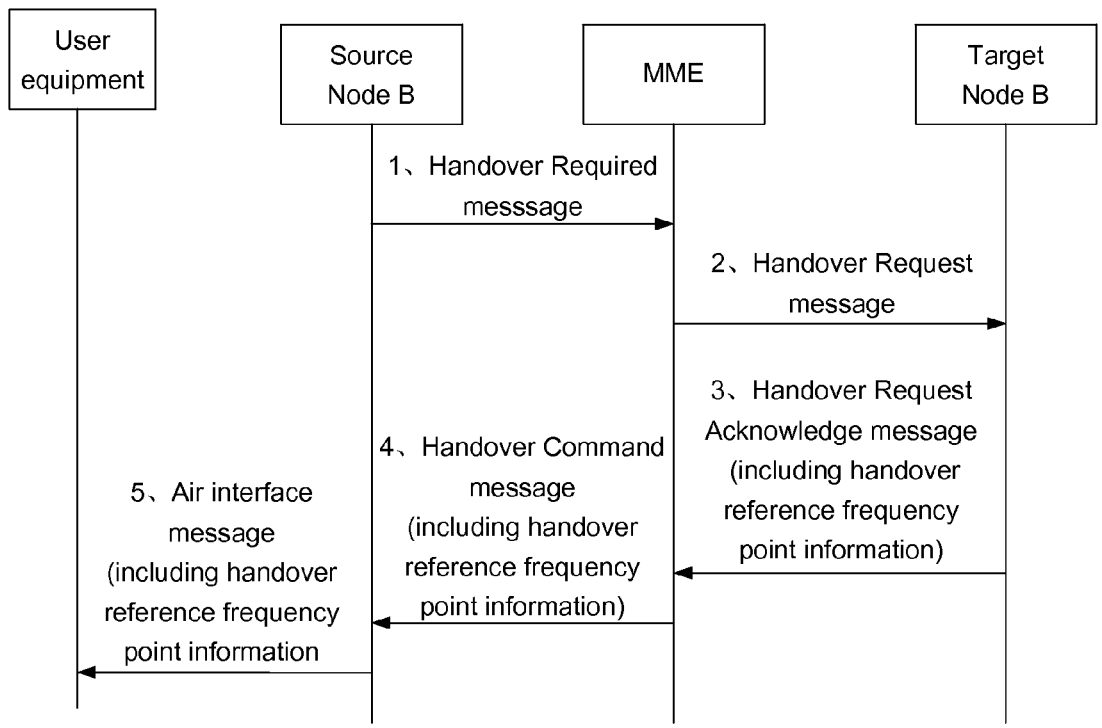
FIG. 5 shows a signaling flowchart of example 2 according to embodiments of the present invention.

FIG. 5 shows a signaling flowchart of example 2 according to the embodiments of the present invention, as shown in FIG. 5, the following processing is included:

Step 1: a source eNB sends a Handover Required message to an Mobility Management Entity (MME) through the interface S1;

Step 2: the MME receives the Handover Required message, and sends a Handover Request message to the target eNB after performing handover resource processing;

Step 3: the target eNB receives the Handover Request message, constructs an Handover Request Acknowledge message and sends the Handover Request Acknowledge message to the MME, specifically, when the target eNB constructs the Handover Request Acknowledge message, the handover reference frequency point information designated by the target cell is included in the Target eNB to Source eNB Transparent Container in the message, preferably, the handover reference frequency point information can be added in the mobility control information.

Specifically, the handover reference frequency point information can include the center frequency point information of the uplink component carrier designated by the target cell for the current user equipment performing the handover to initiate a random access request; preferably, it can further include the center frequency point information of the downlink component carrier designated by the target cell to send a random access response. Furthermore, the target eNB can also transmit the frequency point and bandwidth information of all component carriers of the target cell to the source eNB through the MME, if the frequency point and bandwidth information of all component carriers of the target cell is default, it is deemed that the frequency point and bandwidth information of all component carriers of the target cell is the same as that of the current cell.

Step 4: after receiving the message, the MME transparently transmits the contents in the Transparent Container to the source eNB through a Handover Command message.

Step 5: the source eNB sends the Handover Command message to the user equipment through an air interface message after receiving the Handover Command message, the user equipment initiates a random access process on the designated time/frequency domain resources and reads the random access response message on the designated downlink component carrier after acquiring the reference frequency point information and the random access configuration information related to the component carrier in the Handover Command message.

Through the above processing, the eNB sends the Handover Request Acknowledge message including the handover reference frequency point information through the interface S1, such that the user equipment can send the random access request on the designated uplink component carrier and receive the random access response on the designated downlink component carrier.

Method Embodiment 2

Figure 6:
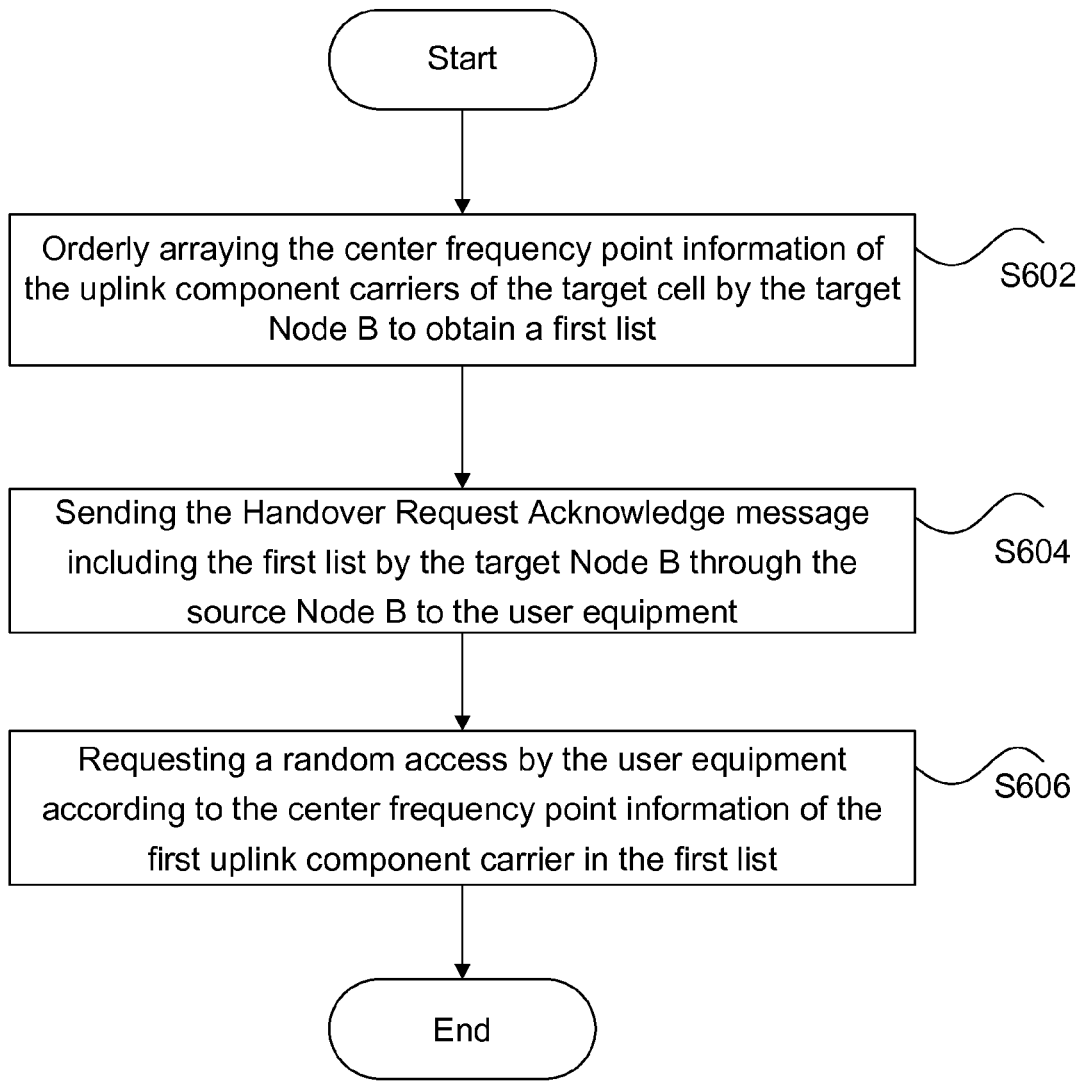
FIG. 6 shows a flowchart of the inter-Node B handover method according to embodiment 2 of the present invention.

According to the embodiments of the present invention, an inter-Node B handover method is provided to hand over a user equipment to a target cell of a target eNB from a source cell of a source eNB. FIG. 6 shows a flowchart of the inter-Node B handover method according to embodiment 2 of the present invention, as shown in FIG. 6, the following processing (steps S602-S606) is included:

Step S602: the target eNB orderly arrays the center frequency point information of the uplink component carriers of the target cell to obtain a first list;

specifically, the target eNB orderly arrays the center frequency point information of the uplink component carriers of the target cell to obtain a first list, wherein the center frequency point information of the first uplink component carrier in the first list is the center frequency point information of the uplink component carrier for the user equipment to initiate a random access request;

in step S602, preferably, the source eNB can further orderly array the center frequency point information of the downlink component carriers of the target cell to obtain a second list, wherein the center frequency point information of the first downlink component carrier in the second list is the center frequency point information of the is downlink component carrier for the target cell to send a random access response.

Step S604: the target eNB sends a Handover Request Acknowledge message including the first list through the source eNB to the user equipment;

preferably, the Handover Request Acknowledge message can also include the second list, in practical application, the above information (the first list and the second list) can be included in the mobility control information; Table 2 shows the structure of the mobility control information including the first list and the second list, as shown in Table 2, the mobility control information includes: a global ID of the target cell, frequency point information of the target cell, bandwidth information of the target cell and other relevant information of mobility control.

TABLE 2

| Included information | Instructions |
| --- | --- |
| Global ID of the target cell | |
| Frequency point information of the target cell | Include the orderly arrayed list of frequency point information of all uplink and downlink component carriers of the target cell, and the target eNB writes the expected handover reference frequency point information into the orderly arrayed list as the first uplink component carrier frequency point and the first downlink component carrier frequency point, and stipulates that the source eNB defaults the first uplink component carrier frequency point and the first downlink component carrier frequency point in the received orderly arrayed list to be the handover reference frequency points |
| Bandwidth information of the target cell | Bandwidth information of all corresponding frequency points |
| Other relevant information of mobility control | Information such as t-304 timer, public radio resource configuration information and random access configuration and the like |

It should be explained that the first list and the second list above can be set integrally.

Step S606: the user equipment requests the random access according to the center frequency point information of the first uplink component carrier in the first list; and preferably, the user equipment receives the random access response sent from the target eNB according to the center frequency point information of the first downlink component carrier.

The above technical solution will be described in detail below in combination with examples.

Example 3

Step 1: No matter the handover is performed through the interface S1 or the interface X2, the target eNB transmits an orderly arrayed list including all the uplink component carrier frequency point information and downlink component carrier is frequency point information of the target cell to the source eNB, and the target eNB writes the expected handover reference frequency point information into the orderly arrayed list as the first uplink component carrier frequency point and the first downlink component carrier frequency point and stipulates that the source eNB defaults the first uplink component carrier frequency point and the first downlink component carrier frequency point in the received orderly arrayed list to be the handover reference frequency points.

Preferably, the orderly arrayed list including all the uplink component carrier frequency point information and downlink component carrier frequency point information of the target cell can be included in the mobility control information in the Target eNB to Source eNB Transparent Container, and the orderly arrayed list above can not be empty, that is, the corresponding frequency point information in the orderly arrayed list defaulted as reference frequency point information cannot be default.

Step 2: the source eNB receives the Handover Request Acknowledge message and then sends this message to the user equipment through an air interface message, and after acquiring the reference frequency point information in the message and the random access configuration information related to the component carrier, the user equipment initiates a random access process on the designated time/frequency domain resources and reads the random access response message on the designated downlink component carrier.

In conclusion, by means of the technical solution of the present invention, the problem that the user equipment is unable to determine the component carrier to request the random access for the handover in the multi-carrier LTE-A system in the relevant technologies is solved by adding the handover reference frequency point information in the Handover Request Acknowledge message, so that the usage rate of random access resources for the target eNB can be improved effectively and the conflict of random accesses can be reduced.

Obviously, those skilled in the art should understand that the above modules or steps of the present invention could be achieved through general calculating devices, and the modules or steps can be concentrated in a single calculating device or distributed in a network formed by multiple calculating devices; optionally, the modules or steps can be achieved by program codes that can be executed by calculating devices, accordingly, the modules or steps can be stored in a storage device to be executed by calculating devices, or can be respectively manufactured into each integrated circuit module, or multiple modules or steps among them can be made into a single integrated circuit module to be realized. In this way, the present invention is not limited to any specific combinations of hardware and software.

The above contents are only preferred embodiments of the present invention and are not used for limiting the present invention. For those skilled in the art, the present invention can have various alternations and changes. Any modifications, equivalent replacements and improvements within the spirit and principle of the present invention should be contained within the protection scope of the present invention.

What is claimed is:

1. A method for inter-Node B handover in a carrier aggregation scenario, comprising:
    sending, by a target evolved Node B (eNB), a Handover Request Acknowledge message including handover reference frequency point information to a source eNB;
    sending, by the source eNB, a handover command including the handover reference frequency point information to a user equipment; and
    requesting, by the user equipment which is in a connected mode, a random access according to the center frequency point information of the uplink component carrier;
    wherein the handover reference frequency point information comprises center frequency point information of an uplink component carrier designated for the user equipment to initiate a random access request; and
    wherein the Handover Request Acknowledge message further includes frequency point and bandwidth information of all component carriers of the target cell of the target eNB.

2. The method according to claim 1, wherein the handover reference frequency point information further comprises: center frequency point information of a downlink component carrier for the target cell of the target eNB to send a random access response.

3. The method according to claim 2, the method further comprising:
    receiving the random access response sent from the target eNB by the user equipment according to the center frequency point information of the downlink component carrier after requesting the random access by the user equipment.

4. The method according to claim 3, the method further comprising:
    sending the Handover Request Acknowledge message by the source eNB through an interface S1/X2 before receiving the Handover Request Acknowledge message by the user equipment, wherein if sending the Handover Request Acknowledge message by the source eNB through the interface X2, the Handover Request Acknowledge message is included in information of all service cells in a scheduled message to be sent; and
    the scheduled message comprises one of the following items: an interface X2 establishment message, an interface X2 establishment response message and an eNB configuration update message.

5. The method according to claim 4, wherein the processing of sending the Handover Request Acknowledge message by the source eNB through the interface S1 comprises:
    sending the transparent container of the Handover Request Acknowledge message by the source eNB through the interface S1 to a mobility management entity; and
    transparently transmitting the transparent container by the mobility management entity to the source eNB through a Handover Command message.

6. The method according to claim 2, the method further comprising:
    sending the Handover Request Acknowledge message by the source eNB through an interface S1/X2 before receiving the Handover Request Acknowledge message by the user equipment, wherein if sending the Handover Request Acknowledge message by the source eNB through the interface X2, the Handover Request Acknowledge message is included in information of all service cells in a scheduled message to be sent; and
    the scheduled message comprises one of the following items: an interface X2 establishment message, an interface X2 establishment response message and an eNB configuration update message.

7. The method according to claim 6, wherein the processing of sending the Handover Request Acknowledge message by the source eNB through the interface S1 comprises:
    sending the transparent container of the Handover Request Acknowledge message by the source eNB through the interface S1 to a mobility management entity; and
    transparently transmitting the transparent container by the mobility management entity to the source eNB through a Handover Command message.

8. The method according to claim 1, wherein the handover reference frequency point information is included in mobility control information of a transparent container of the Handover Request Acknowledge message.

9. The method according to claim 8, the method further comprising:
    sending the Handover Request Acknowledge message by the source eNB through an interface S1/X2 before receiving the Handover Request Acknowledge message by the user equipment, wherein if sending the Handover Request Acknowledge message by the source eNB through the interface X2, the Handover Request Acknowledge message is included in information of all service cells in a scheduled message to be sent; and
    the scheduled message comprises one of the following items: an interface X2 establishment message, an interface X2 establishment response message and an eNB configuration update message.

10. The method according to claim 9, wherein the processing of sending the Handover Request Acknowledge message by the source eNB through the interface S1 comprises:
    sending the transparent container of the Handover Request Acknowledge message by the source eNB through the interface S1 to a mobility management entity; and transparently transmitting the transparent container by the mobility management entity to the source eNB through a Handover Command message.

11. The method according to claim 1, the method further comprising:
    sending the Handover Request Acknowledge message by the source eNB through an interface S1/X2 before receiving the Handover Request Acknowledge message by the user equipment, wherein if sending the Handover Request Acknowledge message by the source eNB through the interface X2, the Handover Request Acknowledge message is included in information of all service cells in a scheduled message to be sent; and
    the scheduled message comprises one of the following items: an interface X2 establishment message, an interface X2 establishment response message and an eNB configuration update message.

12. The method according to claim 11, wherein the processing of sending the Handover Request Acknowledge message by the source eNB through the interface S1 comprises:
    sending the transparent container of the Handover Request Acknowledge message by the source eNB through the interface S1 to a mobility management entity; and
    transparently transmitting the transparent container by the mobility management entity to the source eNB through a Handover Command message.

13. A method for inter-Node B handover in a carrier aggregation scenario the method comprising:

ordering, by a target evolved Node B (eNB), center frequency point information of uplink component carriers of a target cell to obtain a first list, wherein the center frequency point information of a first uplink component carrier in the first list is the center frequency point information of the uplink component carrier for a user equipment to initiate a random access request;

sending, by the target eNB, a Handover Request Acknowledge message including the first list to a source eNB; and sending, by the source eNB, a handover command including the first list to the user equipment;

requesting, by the user equipment which is in a connected mode, a random access according to the center frequency point information of the first uplink component carrier;

wherein the Handover Request Acknowledge message further includes frequency point and bandwidth information of all component carriers of the target cell of the target eNB.

14. The method according to claim 13, further comprising:

ordering, by the source eNB, center frequency point information of downlink component carriers of the target cell to obtain a second list, wherein the center frequency point information of a first downlink component carrier in the second list is the center frequency point information of the downlink component carrier for the target cell to send a random access response.

15. The method according to claim 14, the method further comprising:

receiving the random access response sent from the target eNB by the user equipment according to the center frequency point information of the first downlink component carrier after requesting the random access by the user equipment.

* * * * *